US012738010B2

(12) United States Patent
Sakai

(10) Patent No.: US 12,738,010 B2
(45) Date of Patent: Sep. 15, 2026

(54) OBJECT RECOGNITION DEVICE AND OBJECT RECOGNITION METHOD

(71) Applicant: Hitachi, Ltd., Tokyo (JP)

(72) Inventor: Ryo Sakai, Tokyo (JP)

(73) Assignee: Hitachi, Ltd., Tokyo (JP)

(*) Notice: Subject to any disclaimer, the term of this patent is extended or adjusted under 35 U.S.C. 154(b) by 240 days.

(21) Appl. No.: 18/698,004

(22) PCT Filed: Sep. 14, 2022

(86) PCT No.: PCT/JP2022/034331
§ 371 (c)(1), (2) Date: Apr. 2, 2024

(87) PCT Pub. No.: WO2023/063006
PCT Pub. Date: Apr. 20, 2023

(65) Prior Publication Data
US 2025/0239042 A1 Jul. 24, 2025

(30) Foreign Application Priority Data
Oct. 13, 2021 (JP) ................................ 2021-168196

(51) Int. Cl.
*G06V 10/25* (2022.01)
*B25J 13/08* (2006.01)
(Continued)

(52) U.S. Cl.
CPC ................ *G06V 10/25* (2022.01); *G06T 3/60* (2013.01); *G06T 17/00* (2013.01); *H04N 23/695* (2023.01); *G06V 2201/07* (2022.01)

(58) Field of Classification Search
CPC .... G06V 10/25; G06V 2201/07; G06V 20/64; G06T 3/60; G06T 17/00; G06T 7/00; G06T 7/11; H04N 23/695; B25J 13/08
See application file for complete search history.

(56) References Cited

U.S. PATENT DOCUMENTS

2012/0158180 A1 6/2012 Iio et al.
2019/0384964 A1 12/2019 Ando
2022/0092330 A1* 3/2022 Amano .................... G06T 7/55

FOREIGN PATENT DOCUMENTS

JP 2010071743 A * 4/2010
JP 2012-125886 A 7/2012
(Continued)

OTHER PUBLICATIONS

JP-5698815-B2, Machine English translation (Year: 2015).*
(Continued)

*Primary Examiner* — Vu Le
*Assistant Examiner* — Jessica Yifang Lin
(74) *Attorney, Agent, or Firm* — Foley & Lardner LLP

(57) ABSTRACT

Provided is an object recognition device for detecting an object in an image, with which it is possible to detect, with high accuracy, a target object even in an image that has a background and other objects shown therein. This object recognition device is characterized by comprising: an image acquisition unit which acquires a first image composed of two-dimensional pixels; a three-dimensional shape approximation determination unit which determines whether image information of a prescribed rectangular region within the first image can be approximated by prescribed three-dimensional shape information; an image region estimation unit which clips out the rectangular region as a first estimation region on the basis of a determination result provided by the three-dimensional shape approximation determination unit; and a region selection unit which selects, from among a plurality of the first estimation regions, a first estimation region that has the smallest area.

12 Claims, 3 Drawing Sheets

(51) Int. Cl.

| | |
|---|---|
| ***G06T 3/60*** | (2024.01) |
| ***G06T 7/00*** | (2017.01) |
| ***G06T 7/11*** | (2017.01) |
| ***G06T 17/00*** | (2006.01) |
| ***G06V 20/64*** | (2022.01) |
| ***H04N 23/695*** | (2023.01) |

(56) References Cited

FOREIGN PATENT DOCUMENTS

| | | | |
|---|---|---|---|
| JP | 5698815 | B2 * | 4/2015 |
| JP | 2018-136632 | A | 8/2018 |
| JP | 2019-139640 | A | 8/2019 |

OTHER PUBLICATIONS

JP2010071743A, Machine English translation (Year: 2010).*

Original and English Translation of International Search Report issued in PCT Application No. PCT/JP2022/034331, dated Dec. 6, 2022.

Xingjia Pan et al., "Dynamic Refinement Network for Oriented and Densely Packed Object Detection", 2020 Computer Vision and Pattern Recognition, Jun. 10, 2020, pp. 11207-11216.

* cited by examiner

CASE WHERE INDIVIDUAL PRODUCTS CAN BE IDENTIFIED

CASE WHERE INDIVIDUAL PRODUCTS CANNOT BE IDENTIFIED

OBJECT RECOGNITION DEVICE AND OBJECT RECOGNITION METHOD

TECHNICAL FIELD

The present invention relates to an object recognition device and an object recognition method for detecting an object in an image, and particularly relates to a technique effective for detecting an object in an image in which a background or another object is included in the same image.

BACKGROUND ART

One of the tasks targeted by industrial robots is order picking work in a warehouse. The picking work is a work of taking out and collecting (picking up) products stored in a warehouse according to a picking list or a slip, and accuracy and speed are required. Application expansion of an industrial robot having an object detection function by image processing is expected in order to improve efficiency of picking work and eliminate human errors.

The knowledge of object detection by image processing is applied in many fields such as face recognition and automatic driving, and the accuracy is also greatly improved with the progress of deep learning technology, but technical problems specific to the object detection field also remain.

For example, in a case where a target product is to be detected from a product group in which many types of products are stacked by image processing, there is a possibility that object-containing region including a background or an another object may be estimated depending on the posture of the object, and there is a concern about a decrease in object detection accuracy.

As a background art of the present technical field, for example, there is a technique as described in PTL 1. PTL 1 discloses "An authentication system that does not require processing of an authentication target and that extracts unique information from image data in which an individual feature of the authentication target is obtained using a digital imaging apparatus has a simple configuration, and determines whether the authentication target is valid based on the extracted unique information".

NPL 1 discloses object detection using an object detection network that also estimates an inclination angle of an object.

CITATION LIST

Patent Literature

PTL 1: JP 2019-139640 A

NPL 1: Xingjia Pan et al., "Dynamic Refinement Network for Oriented and Densely Packed Object Detection", 2020 Computer Vision and Pattern Recognition, 10 Jun. 2020, U.S. Plant Pat. No. 11207-11216

SUMMARY OF INVENTION

Technical Problem

As described above, in a case of performing the picking work using the object detection by the image processing, there is a possibility that the object-containing region including a background or another object is estimated and the expected object detection accuracy cannot be obtained, depending on conditions such as the posture of the object.

In PTL 1, after a template of a target object is prepared, the template is rotated to create a pseudo-template, and regions of objects having different postures are estimated by matching the target object appearing in an input image with the pseudo-template.

However, it is necessary to prepare a template for each object, which is disadvantageous in terms of efficiency of picking work and cost.

In NPL 1, it is difficult to train by adding items to be estimated. Furthermore, in addition to the annotation necessary for the normal object detection network for training, an annotation such as adjustment of the inclination angle or the rectangle is separately required, and the number of annotation steps increases.

Therefore, an object of the present invention is to provide an object recognition device and an object recognition method capable of detecting a target object with high accuracy even in an image including a background or another object in an object recognition device which detects an object in the image.

Solution to Problem

In order to solve the above problems, the present invention includes: an image acquisition unit which acquires a first image including two-dimensional pixels; a three-dimensional shape approximation determination unit which determines whether image information of a predetermined rectangular region in the first image is approximatable to predetermined three-dimensional shape information; an image region estimation unit which cuts out the rectangular region as a first estimation region based on a determination result of the three-dimensional shape approximation determination unit; and a region selection unit which selects a region having a smallest area of the first estimation region from among a plurality of the first estimation regions.

In addition, the present invention includes: (a) a step of acquiring a first image including two-dimensional pixels; (b) a step of determining whether image information of a predetermined rectangular region in the first image is approximatable to predetermined three-dimensional shape information; (c) a step of cutting out the rectangular region as a first estimation region based on a determination result of the step (b); and (d) a step of selecting a region having a smallest area of the first estimation region from among a plurality of the first estimation regions.

Advantageous Effects of Invention

According to the present invention, in an object recognition device which detects an object in an image, it is possible to realize an object recognition device and an object recognition method capable of detecting a target object with high accuracy even in an image including a background or another object.

This enables an accurate and rapid picking work in the warehouse.

Problems, configurations, and effects other than those described above will be clarified by the following description of embodiments.

DESCRIPTION OF EMBODIMENTS

Figure 1:
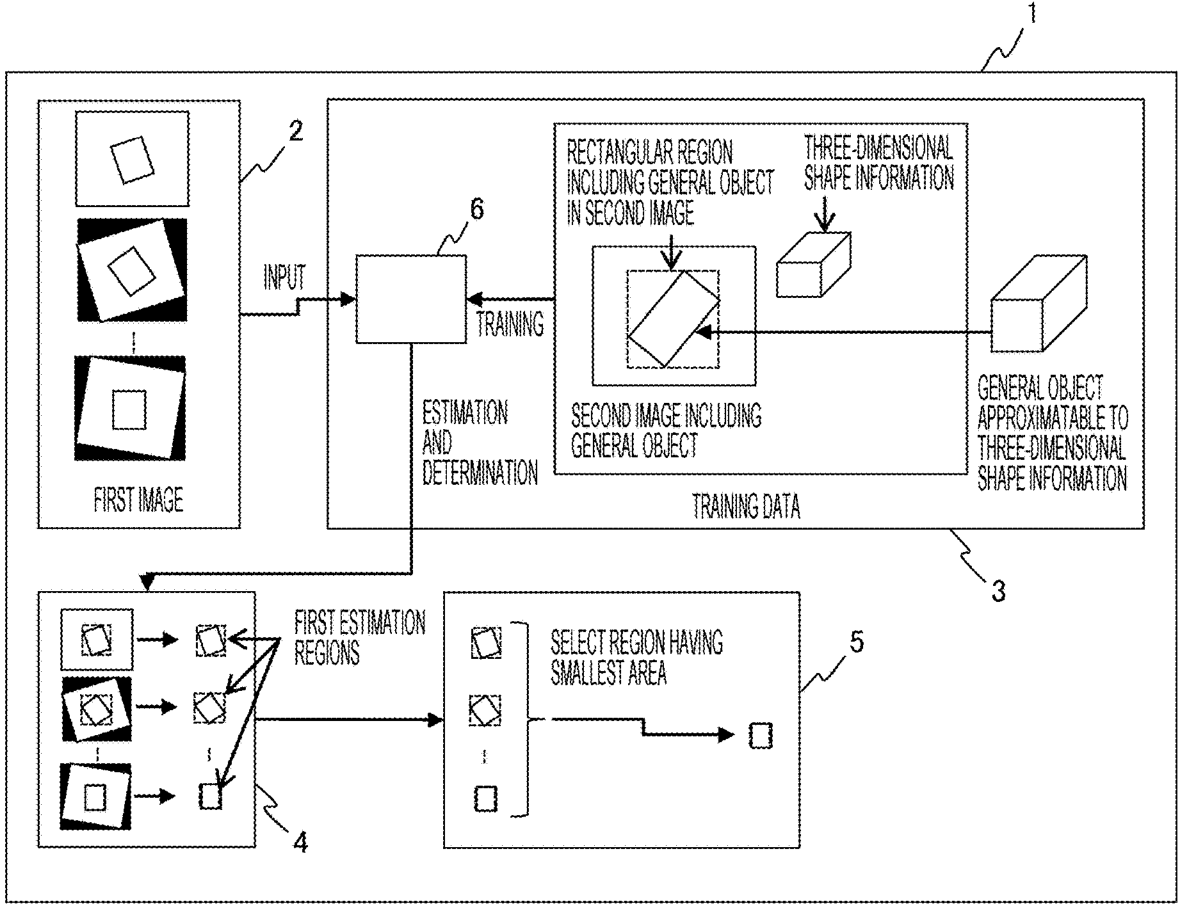
FIG. 1 is a diagram illustrating a schematic configuration of an object recognition device according to a first embodiment of the present invention.

Hereinafter, embodiments of the present invention will be described with reference to the drawings. In the drawings, the same components are denoted by the same reference numerals, and the detailed description of the overlapping description will be omitted.

First Embodiment

Figure 4:
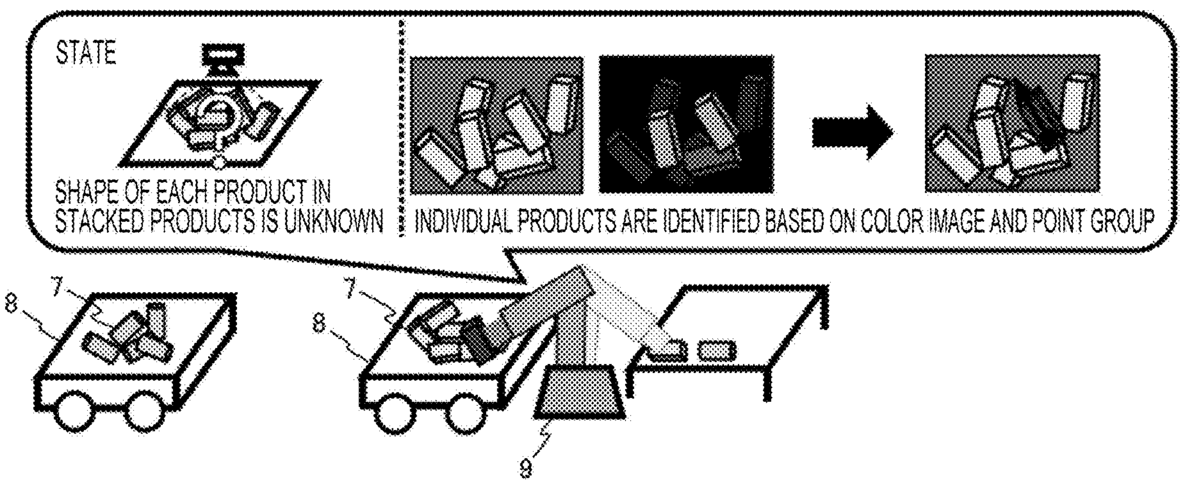
FIG. 4 is a view illustrating a work example to which the present invention is applied.
Figure 5:
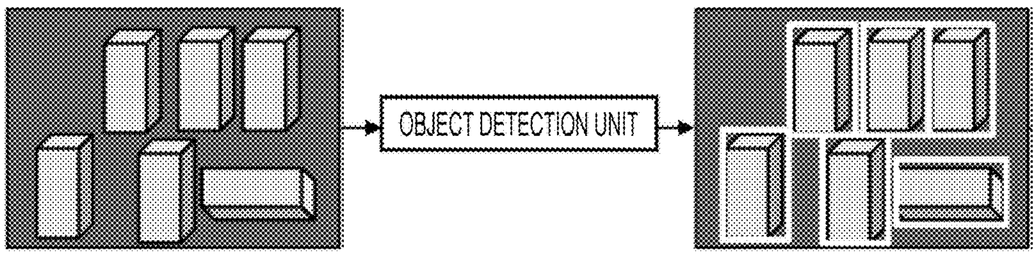
FIG. 5 is a diagram illustrating a problem of a conventional technique.
Figure 5:
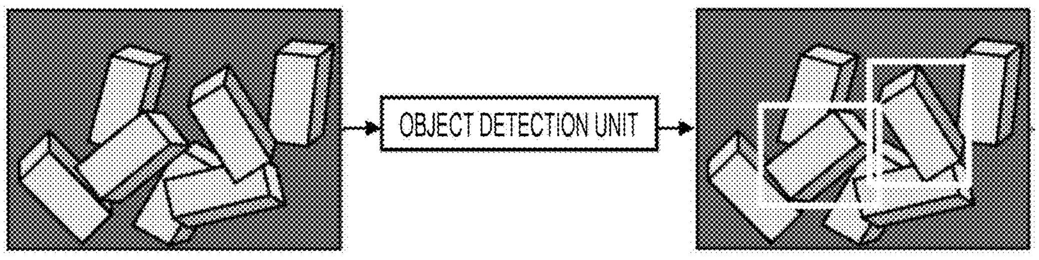

First, work examples to which the present invention is applied and problems thereof will be described with reference to FIGS. 4 and 5. FIG. 4 is a diagram illustrating a work example to which the present invention is applied, and illustrates an order picking work in a warehouse by an industrial robot 9. FIG. 5 is a diagram illustrating a problem in the work of FIG. 4.

For example, it is considered that various types of products 7 are stored in a stacked state on a cart 8 in a warehouse, and the shape of each product 7 is unknown. In the conventional art, as illustrated in FIG. 4, individual products are identified from a color image obtained by photographing the product group 7 and a point group obtained by image processing. The industrial robot 9 takes out the products 7 stored in the warehouse according to a picking list or a slip.

In the conventional picking work using such the industrial robot 9, as illustrated in FIG. 5, in a case where individual products are stored relatively orderly without overlapping, the individual products can be accurately identified by image recognition by the object detection unit attached to the industrial robot 9.

On the other hand, in a case where individual products are stored in a cluttered manner so as to overlap each other, or in a case where shapes and sizes of the products are various, there is a possibility that an object-containing region including a background and another object is estimated in image recognition by the object detection unit, and there is a possibility that object detection accuracy is deteriorated. Therefore, depending on the storage state of the product group, there is a possibility that the picking work by the industrial robot 9 is not performed well.

Figure 2:
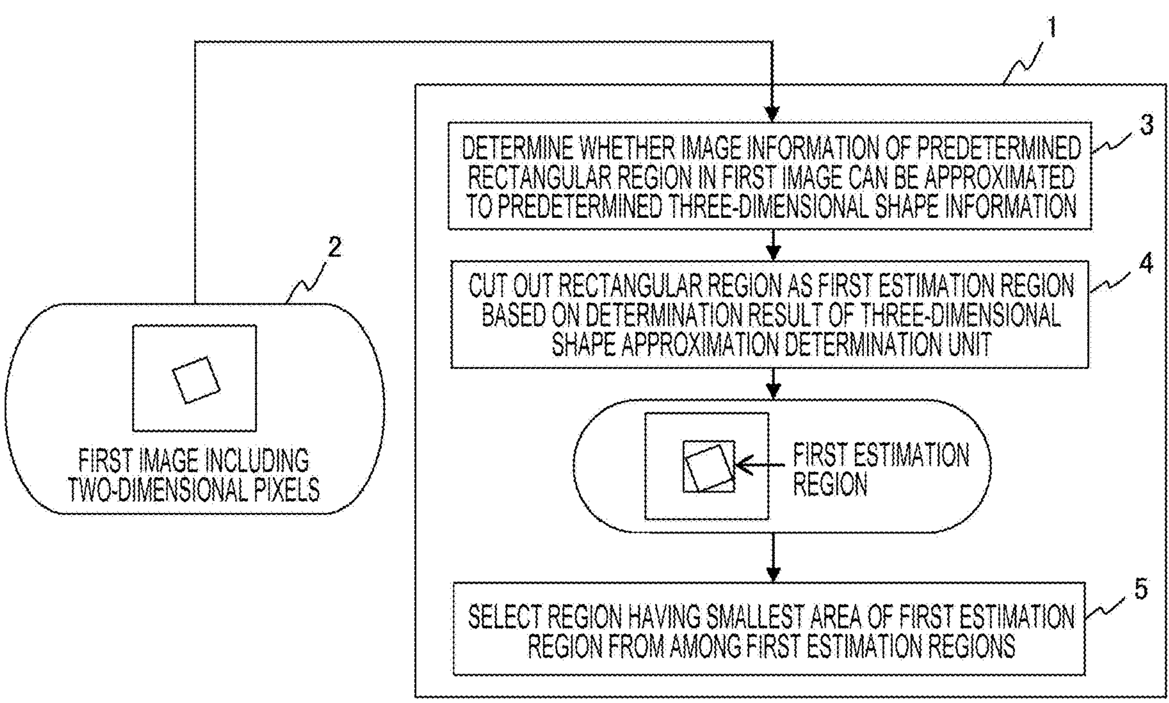
FIG. 2 is a flowchart illustrating an object recognition method according to the first embodiment of the present invention.
Figure 3:
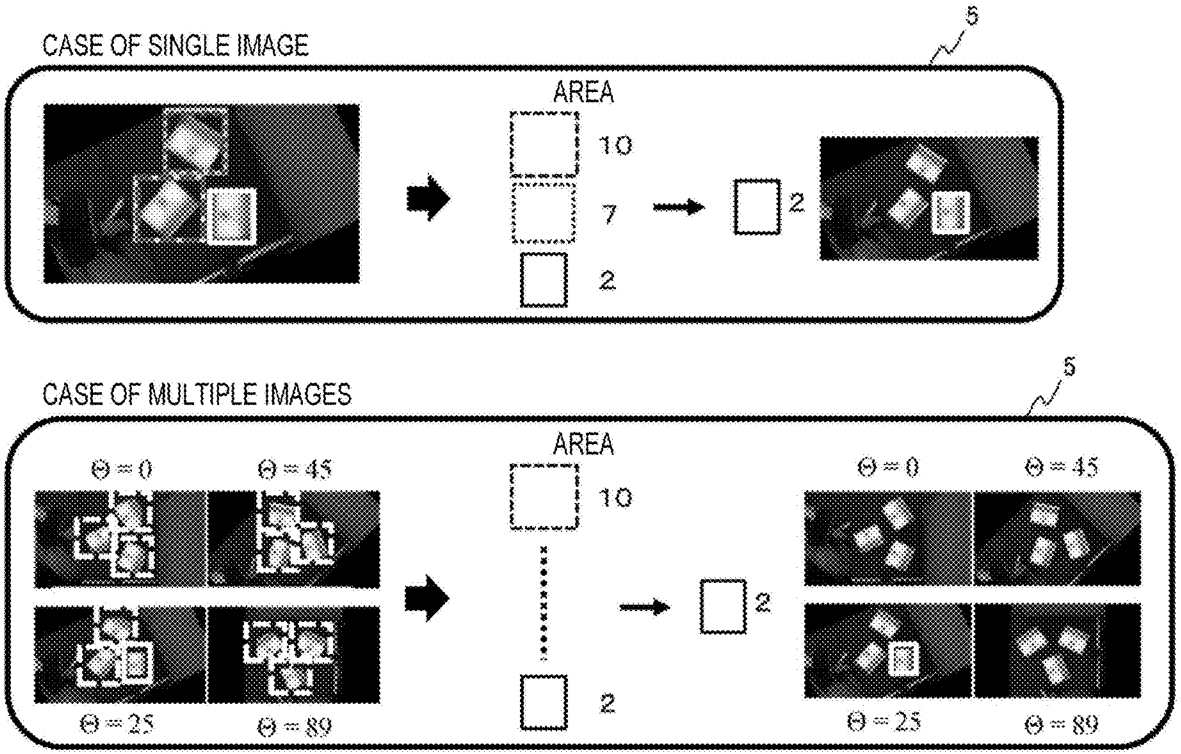
FIG. 3 is a diagram conceptually illustrating functions of a region selection unit in FIG. 1.

Next, the object recognition device and the object recognition method according to the present embodiment will be described with reference to FIGS. 1 to 3. FIG. 1 is a diagram illustrating a schematic configuration of the object recognition device according to the present embodiment. FIG. 2 is a flowchart illustrating the object recognition method according to the present embodiment. FIG. 3 is a diagram conceptually illustrating functions of a region selection unit 5 in FIG. 1.

As illustrated in FIGS. 1 and 2, the object recognition device 1 of the present embodiment includes an image acquisition unit 2, a three-dimensional shape approximation determination unit 3, an image region estimation unit 4, and a region selection unit 5 as main components. The three-dimensional shape approximation determination unit 3 includes a training device 6.

The image acquisition unit 2 acquires a first image including two-dimensional pixels based on imaging captured by an image sensor (not illustrated).

The three-dimensional shape approximation determination unit 3 determines whether image information of a predetermined rectangular region in the first image acquired by the image acquisition unit 2 can be approximated to predetermined three-dimensional shape information.

The image region estimation unit 4 cuts out rectangular region as a first estimation region based on a determination result: of the three-dimensional shape approximation determination unit 3.

The region selection unit 5 selects a region having the smallest area of the first estimation region from among the plurality of first estimation regions cut out by the image region estimation unit 4.

With reference to FIG. 3, a method for selecting a region having the smallest area of the first estimation region by the region selection unit 5 will be described.

In a case where a single image is acquired as the first image, as illustrated in the upper diagram of FIG. 3, a predetermined rectangular region is defined by, for example, areas (2, 7, 10). Then, the region ("2") having the smallest area is selected as the object (product) to be detected.

In addition, when a plurality of images are acquired as the first image, as illustrated in the lower diagram of FIG. 3, a predetermined rectangular region is defined by, for example, areas (arbitrary between 2 to 10). Then, the region ("2") having the smallest area is selected as the object (product) to be detected.

Note that the lower diagram of FIG. 3 illustrates an example in which the image acquisition unit 2 generates four rotated images (θ: 0°, 25°, 45°, 89°) obtained by rotating the first image and uses the rotated images as the first image.

The object recognition device 1 of the present embodiment is configured as described above, and can detect a target object with high accuracy even in an image including a background or another object.

Hereinafter, a specific configuration example and function of the object recognition device 1 will be described.

<<Specific Example of "Three-Dimensional Shape Information">>

The three-dimensional shape information is at least one of a box shape, a cylindrical shape, a conical shape, a triangular prism shape, a triangular pyramid shape, a quadrangular pyramid shape, a sphere shape, and a torus shape, and may include a shape that can be expressed by a combination of the three-dimensional shape information.

<<Specific Example 1 of "First Image": Case of Rotating Image>>

For example, the image acquisition unit 2 may generate at least one rotated image obtained by rotating the first image and use the rotated image as the first image.

<<Specific Example of Method for Generating "Rotated Image">>

The image acquisition unit 2 may generate n ($1 \le n \le N$) rotated images for each constant discrete rotation angle value.

<<Specific Example 2 of "First Image": Case of Rotating Image Sensor (Camera)>>

The image acquisition unit 2 may acquire at least one first image by rotating the image sensor about the optical axis direction of the image sensor when acquiring the first image from the image sensor (camera).

<<Rotation Method of "Image Sensor">>

The image acquisition unit 2 may rotate the image sensor n times ($1 \le n \le N$) for each constant discrete rotation angle value.

<<Specific Example 1 of "Three-Dimensional Shape Approximation Determination Unit": Method Where a Part of Determining Whether to Approximate to Three-Dimensional Shape Information is a Machine Learning>>

The three-dimensional shape approximation determination unit 3 may determine whether or not to approximate to predetermined three-dimensional shape information using the training device 6 trained by using a second image including a general object that can be approximated to the predetermined three-dimensional shape information, information indicating a rectangular region including the general object in the second image, and the predetermined three-dimensional shape information as training data.

<<Specific Example 2 of "Three-Dimensional Shape Approximation Determination Unit": Method a Part of Estimating a Position of a Predetermined Rectangular Region and Determining Whether to Approximate to Three-Dimensional Shape Information is a Machine Learning>>

The three-dimensional shape approximation determination unit 3 may estimate the position of the predetermined rectangular region in the first image and determine whether to approximate to predetermined three-dimensional shape information using the training device trained by using a second image including a general object that can be approximated to the predetermined three-dimensional shape information, information indicating a rectangular region including the general object in the second image, and the predetermined three-dimensional shape information as training data.

<<Specific Example of "Training Data">>

The training data may include the second image which is an image obtained by capturing a 3D model having a size randomly selected from a certain range based on predetermined three-dimensional shape information and arranged in a virtual environment in a random position and posture by a virtual camera which is arranged in a position and posture in which an image of a surface of the 3D model can be obtained; information indicating a rectangular region including the 3D model; and the predetermined three-dimensional shape information.

<<Simultaneous Estimation of Objects>>

The region selection unit 5 may identify rectangular regions including the same object from all first estimation regions, generate at least one same object rectangular region group, and select a rectangular region having the smallest area for each same object rectangular region group.

<<Generation Procedure of "Same Object Rectangular Region Group">>

It is possible to generate a same object rectangular region group by generating a same rectangular-containing region group having information obtained from a first estimation region cut out from an nth first image as an element, and a same object tracking list having a same object rectangular region group an as element; estimating information of a predicted existing region in an (n+1)th first image by using a rotation angle at which the (n+1)th first image is generated and information obtained from a latest first estimation region of the same object rectangular region group which is each element of the same object tracking list; generating a same object predicted existing region group having information obtained from the first estimation region or information of the predicted existing region as an element and a predicted existing region list having the same object predicted existing region group as an element, by using information of the predicted existing region and the same object tracking list; and determining whether to, in accordance with the matching degree between the information obtained from the first estimation region cut out from the (n+1)th first image and the latest element of the same object predicted existing region group which is each element of the predicted existing region list, add the information obtained from the first estimation region cut out from the (n+1)th first image as an element of the same object rectangular region group, and update the same object tracking list, or to update the same object tracking list as a new same object rectangular region group.

<<Specific Example 1 of "Information Obtained From First Estimation Region">>

It is possible to use an Axis Aligned Bounding Box or an Oriented Bounding Box as information obtained from the first estimation region and information of the predicted existing region, and to use an intersection over union (IOU) as a matching degree between information obtained from the first estimation region cut out from the (n+1)th first image and a latest element of the same object predicted existing region group which is each element of the predicted existing region list.

<<Specific Example 2 of "Information Obtained From First Estimation Region">>

It is possible to use the centroid point of the first estimation region as the information obtained from the first estimation region, the centroid point of the predicted existing region as the information of the predicted existing region, and the distance between the centroid points as the matching degree between the information obtained from the object rectangular region belonging to the (n+1)th rotated input image and the latest element of each same object predicted existing region group in the predicted existing region list.

Note that the present invention is not limited to the above-described embodiments, and includes various modifications. For example, the above-described embodiments have been described in detail in order to simply describe the present invention, and are not necessarily limited to those having all the described configurations. In addition, a part of the configuration of a certain embodiment can be replaced with the configuration of another embodiment, and the configuration of another embodiment can be added to the configuration of a certain embodiment. In addition, it is also possible to add, delete, and replace other configurations for a part of the configuration of each embodiment.

REFERENCE SIGNS LIST

1 object recognition device
2 image acquisition unit
3 three-dimensional shape approximation determination unit
4 image region estimation unit
5 region selection unit
6 training device
7 product (group)
8 cart
9 industrial robot

The invention claimed is:

1. An object recognition device comprising:

an image acquisition unit which acquires a first image including two-dimensional pixels;

a three-dimensional shape approximation determination unit which determines whether image information of a predetermined rectangular region in the first image is approximatable to predetermined three-dimensional shape information;

an image region estimation unit which cuts out the rectangular region as a first estimation region based on a determination result of the three-dimensional shape approximation determination unit; and a region selection unit which selects a region having a smallest area of the first estimation region from among a plurality of the first estimation regions;

wherein the image acquisition unit generates at least one rotated image obtained by rotating the first image, and uses the rotated image as the first image;

wherein n (1≤n≤N) rotated images are generated for each fixed discrete rotation angle value; and wherein the region selection unit identifies rectangular regions including a same object from all the first estimation regions, generates at least one same object rectangular region group, and selects a rectangular region having the smallest area for each same object rectangular region group.

2. The object recognition device according to claim 1, wherein the three-dimensional shape information is at least one of a box shape, a cylindrical shape, a conical shape, a triangular prism shape, a triangular pyramid shape, a quadrangular pyramid shape, a sphere shape, and a torus shape, and includes a shape expressed by a combination of the three-dimensional shape information.

3. The object recognition device according to claim 1, wherein the image acquisition unit acquires at least one first image by rotating an image sensor about an optical axis direction of the image sensor when the first image is acquired from the image sensor.

4. The object recognition device according to claim 3, wherein the image sensor is rotated n times (1≤n≤N) for each fixed discrete rotation angle value.

5. The object recognition device according to claim 1, wherein the three-dimensional shape approximation determination unit determines whether to approximate to the predetermined three-dimensional shape information using a training device trained by using a second image including a general object approximatable to the predetermined three-dimensional shape information, information indicating a rectangular region including the general object in the second image, and the predetermined three-dimensional shape information as training data.

6. The object recognition device according to claim 1, wherein the three-dimensional shape approximation determination unit estimates a position of the predetermined rectangular region in the first image and determines whether to approximate to the predetermined three-dimensional shape information using a training device trained by using a second image including a general object approximatable to the predetermined three-dimensional shape information, information indicating a rectangular region including the general object in the second image, and the predetermined three-dimensional shape information as training data.

7. The object recognition device according to claim 5, wherein the training data includes the second image which is an image obtained by capturing a 3D model having a size randomly selected from a certain range based on predetermined three-dimensional shape information and arranged in a virtual environment in a random position and posture by a virtual camera which is arranged in a position and posture in which an image of a surface of the 3D model is obtainable; information indicating a rectangular region including the 3D model; and the predetermined three-dimensional shape information.

8. The object recognition device according to claim 1, wherein;

the same object rectangular region group is generated by:

generating a same rectangular-containing region group having information obtained from the first estimation region cut out from an nth first image as an element, and a same object tracking list having the same object rectangular region group as an element, estimating information of a predicted existing region in an (n+1)th first image by using a rotation angle at which the (n+1)th first image is generated and information obtained from a latest first estimation region of the same object rectangular region group which is each element of the same object tracking list, generating a same object predicted existing region group having information obtained from the first estimation region or information of the predicted existing region as an element and a predicted existing region list having the same object predicted existing region group as an element, by using information of the predicted existing region and the same object tracking list, and determining whether, in accordance with a matching degree between information obtained from the first estimation region cut out from the (n+1)th first image and a latest element of the same object predicted existing region group which is each element of the predicted existing region list, to add information obtained from the first estimation region cut out from the (n+1)th first image as an element of the same object rectangular region group, and update the same object tracking list, or to update the same object tracking list as a new same object rectangular region group.

9. The object recognition device according to claim 8, wherein an Axis Aligned Bounding Box or an Oriented Bounding Box is used as information obtained from the first estimation region and information of the predicted existing region, an intersection over union (IOU) is used as a matching degree between information obtained from the first estimation region cut out from the (n+1)th first image and a latest element of the same object predicted existing region group which is each element of the predicted existing region list.

10. The object recognition device according to claim 8, wherein a centroid point of the first estimation region is used as information obtained from the first estimation region, a centroid point of the predicted existing region is used as information of the predicted existing region, and a distance between the centroid points is used as a matching degree between information obtained from an object rectangular region belonging to an (n+1)th rotated input image and a latest element of each same object predicted existing region group in a predicted existing region list.

11. An object recognition method comprising the steps of:

(a) acquiring a first image including two-dimensional pixels;

(b) determining whether image information of a predetermined rectangular region in the first image is approximatable to predetermined three-dimensional shape information;

(c) cutting out the rectangular region as a first estimation region based on a determination result of step (b); and (d) selecting a region having a smallest area of the first estimation region from among a plurality of the first estimation regions;

wherein the three-dimensional shape information is at least one of a box shape, a cylindrical shape, a conical shape, a triangular prism shape, a triangular pyramid shape, a quadrangular pyramid shape, a sphere shape, and a torus shape, and includes a shape expressed by a combination of the three-dimensional shape information.

12. The object recognition device according to claim 6, wherein the training data includes the second image which is an image obtained by capturing a 3D model having a size randomly selected from a certain range based on predetermined three-dimensional shape information and arranged in a virtual environment in a random position and posture by a virtual camera which is arranged in a position and posture in which an image of a surface of the 3D model is obtainable; information indicating a rectangular region including the 3D model; and the predetermined three-dimensional shape information.

* * * * *